United States Patent
Takakuwa et al.

(10) Patent No.: US 10,106,219 B2
(45) Date of Patent: Oct. 23, 2018

(54) COWL STAY STRUCTURE FOR VEHICLE, AND VEHICLE INCLUDING SAME

(71) Applicant: HONDA MOTOR CO., LTD., Minato-ku, Tokyo (JP)

(72) Inventors: Dai Takakuwa, Wako (JP); Hirotsugu Ueno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 15/202,061

(22) Filed: Jul. 5, 2016

(65) Prior Publication Data
US 2017/0015382 A1     Jan. 19, 2017

(30) Foreign Application Priority Data
Jul. 15, 2015   (JP) .................................. 2015-141587

(51) Int. Cl.
| | |
|---|---|
| *B62K 19/30* | (2006.01) |
| *B62J 6/02* | (2006.01) |
| *B62J 6/18* | (2006.01) |
| *B62J 17/00* | (2006.01) |
| *F02M 35/04* | (2006.01) |
| *B62K 11/04* | (2006.01) |

(Continued)

(52) U.S. Cl.
CPC ................ *B62K 19/30* (2013.01); *B62J 6/02* (2013.01); *B62J 6/18* (2013.01); *B62J 17/00* (2013.01); *B62K 11/04* (2013.01); *F02M 35/048* (2013.01); *F02M 35/10006* (2013.01); *F02M 35/10013* (2013.01); *F02M 35/162* (2013.01); *B62J 35/00* (2013.01); *B62J 99/00* (2013.01)

(58) Field of Classification Search
CPC ..... B62K 19/30; B62J 6/02; B62J 6/18; B62J 17/00; B62J 17/02; F02M 35/048; F02M 35/162; F02M 35/10006; F02M 35/10013
See application file for complete search history.

(56) References Cited

U.S. PATENT DOCUMENTS

| | | | | |
|---|---|---|---|---|
| 5,577,570 A | * | 11/1996 | Shiohara | ................ B60K 13/02 |
| | | | | 180/219 |
| 6,409,783 B1 | * | 6/2002 | Miyajima | .............. F02M 35/04 |
| | | | | 123/198 E |

(Continued)

FOREIGN PATENT DOCUMENTS

| | | |
|---|---|---|
| JP | H09-95273 A | 4/1997 |
| JP | 2011-148451 A | 8/2011 |

*Primary Examiner* — Joseph M Rocca
*Assistant Examiner* — Michael R Stabley
(74) *Attorney, Agent, or Firm* — Carrier Blackman & Associates, P.C.; Joseph P. Carrier; Anne G. Sabourin

(57) ABSTRACT

In a cowl stay structure for a vehicle which is mounted on a front end part of a body frame having a pair of main frames extending longitudinally to the left and right, and which supports a cowling, a cowl stay supporting the cowling has a front opening which serves as a duct with a hollow structure designed to guide the air taken in from a front side of a vehicle body to an air cleaner box. The cowl stay is mounted on a front surface of a head pipe arranged on the front end of the body frame for establishing a flow path of the front opening with said head pipe opening. A headlight configured to irradiate an area in front of a vehicle with light is placed inside the cowl stay. Such a cowl stay structure has reduced size and weight, and it supports multiple parts.

15 Claims, 10 Drawing Sheets

(51) Int. Cl.
    *F02M 35/10*     (2006.01)
    *F02M 35/16*     (2006.01)
    *B62J 35/00*     (2006.01)
    *B62J 99/00*     (2009.01)

(56) References Cited

U.S. PATENT DOCUMENTS

| | | | | |
|---|---|---|---|---|
| 7,264,072 | B2* | 9/2007 | Yoshikawa | F02M 35/04 123/184.21 |
| 7,270,207 | B2* | 9/2007 | Idei | F02B 61/02 180/219 |
| 7,380,624 | B2* | 6/2008 | Momosaki | F02M 35/10013 180/68.3 |
| 7,748,746 | B2* | 7/2010 | Beiber Hoeve | B62K 11/04 180/219 |
| 8,006,791 | B2* | 8/2011 | Nakagome | B62J 17/02 180/219 |
| 9,016,421 | B2* | 4/2015 | Kontani | B62K 11/00 180/219 |
| 9,370,996 | B2* | 6/2016 | Kawata | B60K 13/02 |
| 2004/0050357 | A1* | 3/2004 | Idei | F02B 61/02 123/198 E |
| 2005/0051375 | A1* | 3/2005 | Momosaki | F02M 35/10013 180/219 |
| 2006/0219201 | A1* | 10/2006 | Seki | F02M 35/10013 123/184.55 |
| 2007/0149105 | A1* | 6/2007 | Nakagome | B62J 17/02 454/136 |
| 2010/0071991 | A1* | 3/2010 | Ono | F02M 35/10144 181/229 |
| 2013/0306391 | A1* | 11/2013 | Kontani | B62K 11/00 180/219 |
| 2014/0090912 | A1* | 4/2014 | Kontani | B62J 17/02 180/68.3 |
| 2015/0027797 | A1* | 1/2015 | Miki | B62K 11/04 180/219 |
| 2015/0136511 | A1* | 5/2015 | Kawata | B60K 13/02 180/219 |

\* cited by examiner

COWL STAY STRUCTURE FOR VEHICLE, AND VEHICLE INCLUDING SAME

CROSS-REFERENCE TO RELATED APPLICATIONS

The present invention claims priority under 35 USC 119 based on Japanese Patent Application No. 2015-141587, filed on Jul. 15, 2015. The entire subject matter of this priority document, including specification claims and drawings thereof, is incorporated by reference herein.

BACKGROUND OF THE INVENTION

1. Field of the Invention

The present invention relates to a cowl stay structure for a vehicle, and to a vehicle including the same. More particularly, the present invention relates to a cowl stay structure including a cowl stay for a vehicle for fixing, on a body frame, a cowling as an exterior part to cover a front part of a vehicle body, and to a vehicle including the same.

2. Description of the Background Art

There is known structure of a motorcycle in which a meter device, a headlight, a rear-view mirror, a cowling as a windscreen device, and the like are mounted at the front side of a steering handlebar in the motorcycle.

For example, the Japanese Patent Application Publication No. Hei 9-95273 discloses a motorcycle with the number of parts reduced by integrating stays for mounting a meter device, a headlight, a rearview mirror, and the like into a cowl stay for mounting a cowling to a body frame.

However, to make the cowl stay support the multiple parts, a problem arises in which the cowl stay tends to increase in size due to its complicated structure, and also tends to increase in weight to secure necessary strength.

An objective of the present invention is to solve the problem of the existing technique described above, and to provide a cowl stay structure for a vehicle which enables a cowl stay to reduce its size and weight while supporting multiple parts.

SUMMARY OF THE INVENTION

Reference numbers are included in the following description corresponding to the reference numbers used in the drawings. Such reference numbers are provided for purposes of illustration, and are not intended to limit the invention.

In order to achieve the above objects, the present invention according to a first aspect thereof provides a cowl stay structure (S) including a cowl stay (30) for a vehicle which is mounted on a front end part of a body frame (2) and supports a cowling (9), characterized in that the cowl stay (30) supporting the cowling (9) has a front opening (33) which serves as a duct with a hollow structure designed to guide the air taken in from the front side of a vehicle body to an air cleaner box (4), the cowl stay (30) is mounted on the front surface of a head pipe (8), mounted on the front end of the body frame (2), so as to close a head pipe opening (8b) which is formed in the head pipe (8) and serves as an air intake for the air cleaner box (4), and a headlight (25) configured to irradiate an area in front of a vehicle (1) with light is placed inside the cowl stay (30).

Further, the present invention according to a second aspect thereof is characterized in that the cowl stay (30) is formed from an upper member (31) and a lower member (32) into which the hollow structure is divided vertically, the upper member (31) supports at least the cowling (9) and the headlight (25), the upper member (31) and the lower member (32) are made of members (materials) different in strength such that the upper member (31) is made of material having higher strength than that of the lower member (32).

Further, the present invention according to a third aspect thereof is characterized in that a pair of left and right upward extending portions (40) extending upward is provided on an upper surface of the cowl stay (30), upper end parts of the respective upward extending portions (40) are coupled together by a coupling portion (42) having a truss structure, and a mounting boss (43, 43a) which supports a meter device (26) configured to display vehicle information is provided on the coupling portion (42).

Further, the present invention according to a fourth aspect thereof is characterized in that the structure includes a pair of first laterally extending portions (34L, 34R) which are coupled to the upper end parts of the upward extending portions (40) and extend outward in the vehicle widthwise direction, and the first laterally extending portions (34L, 34R) each support at least one of a rearview mirror (70) and a direction indicator (71) at a direction indicator supporting portion (52).

Further, the present invention according to a fifth aspect thereof is characterized in that the first laterally extending portions (34L, 34R) each include a truss-shaped thinning portion (45).

Further, the present invention according to a sixth aspect thereof is characterized in that a through hole (49) through which a headlight harness (68) configured to supply power to the headlight (25) passes is formed in the cowl stay (30) at a position behind the meter device (26), and, in an area behind the meter device (26), the headlight harness (68) constitutes a junction area (95) where the headlight harness meets with a meter device harness (90) coupled to the meter device (26).

Further, the present invention according to a seventh aspect thereof is characterized in that a direction indicator harness (91) configured to supply power to each direction indicator (71) is routed along guide grooves (34b) which are respectively formed in the first laterally extending portions (34L, 34R) to have a C shape in cross section, and the direction indicator harness meets with the headlight harness (68) and the meter device harness (90) at the junction area (95).

Further, the present invention according to an eighth aspect thereof is characterized in that a rear opening (33b) of the cowl stay (30) is fixed on a box-shaped standing wall (8a), defining the head pipe opening (8b) of the head pipe (8), with multiple fastening members fastened into the cowl stay and the standing wall from the outer side in the vehicle widthwise direction.

Effect of the Invention

According to the first aspect of the present invention, the cowl stay (30) supporting the cowling (9) has the front opening (33) which serves as a duct with a hollow structure designed to guide the air taken in from the front side of the vehicle body to the air cleaner box (4), the cowl stay (30) is mounted on the front surface of the head pipe (8), mounted on the front end of the body frame (2), so as to close the head pipe opening (8b) which is formed in the head pipe (8) and serves as the air intake for the air cleaner box (4), and the headlight (25) configured to irradiate an area in front of the vehicle (1) with light is placed inside the cowl stay (30). Thus, the cowl stay serves also as a duct with a hollow structure designed to guide the air taken in from the front side of the vehicle body to the cleaner box, whereby the number of parts can be reduced.

In addition, the headlight is placed inside the cowl stay with a hollow structure, which simplifies the structure of the cowl stay and downsizes the cowl stay. Further, in a vehicle having a structure of guiding the air introduced from the front side of a vehicle body from the front side to the rear side of a body frame through an opening formed in a head pipe, the cowl stay can be installed at a position closing this opening and at the best position for the cowl stay to support a cowling.

According to the second aspect of the present invention, the cowl stay (30) is formed from the upper member (31) and the lower member (32) into which the hollow structure is divided vertically, the upper member (31) supports at least the cowling (9) and the headlight (25), the upper member (31) and the lower member (32) are made of members different in strength, and the upper member (31) is made of a member having higher strength than that of the lower member (32). Thus, a member with high strength is used only for the upper cowl stay which needs strength for supporting multiple parts, which enables the cowl stay to reduce its total weight while securing sufficient strength.

According to the third aspect of the present invention, the pair of left and right upward extending portions (40) extending upward is provided on the upper surface of the cowl stay (30), the upper end parts of the respective upward extending portions (40) are coupled together by the coupling portion (42) having a truss structure, and the mounting boss (43, 43a) which supports the meter device (26) configured to display vehicle information is provided on the coupling portion (42). Thus, the coupling portion with a truss structure can increase the rigidity of the upward extending portions and the cowl stay, whereby the cowl stay can be reduced in size and also reduced in weight due to the thinning and the like of the cowl stay. In addition, by using the coupling portion, it is possible to support the meter device without increasing the number of parts.

According to the fourth aspect of the present invention, the cowl stay structure (S) includes the pair of first laterally extending portions (34L, 34R) which are coupled to the upper end parts of the upward extending portions (40) and extend outward in the vehicle widthwise direction, and the first laterally extending portions (34L, 34R) each support at least one of the rearview mirror (70) and the direction indicator (71) at the direction indicator supporting portion (52). Thus, the rearview mirror and the direction indicator can be supported without any additional part other than the cowl stay, and hence the cowl stay can be downsized while supporting many parts, achieving a compact structure.

According to the fifth aspect of the present invention, the first laterally extending portions (34L, 34R) each include a truss-shaped thinning portion (45). Thus, the cowl stay can be reduced in weight while keeping its strength.

According to the sixth aspect of the present invention, the through hole (49) through which the headlight harness (68) configured to supply power to the headlight (25) passes is formed in the cowl stay (30) at a position behind the meter device (26), and in an area behind the meter device (26), the headlight harness (68) constitutes the junction area (95) where the headlight harness meets with the meter device harness (90) coupled to the meter device (26). Since the harnesses meet through the insertion hole, the harness routing structure can be simplified. Thereby, the routing distance of the harnesses can be shortened, which reduces cost and achieves a compact structure of the cowl stay.

According to the seventh aspect of the present invention, the direction indicator harness (91) configured to supply power to each direction indicator (71) is routed along the guide grooves (34b) which are respectively formed in the first laterally extending portions (34L, 34R) to have a C shape in cross section, and the direction indicator harness meets with the headlight harness (68) and the meter device harness (90) at the junction area (95). Since the guide grooves are formed in the first laterally extending portions, additional harness guides do not have to be provided, whereby the number of parts can be reduced and the cowl stay can be downsized and achieve a compact structure.

According to the eighth aspect of the present invention, the rear opening (33b) of the cowl stay (30) is fixed on the box-shaped standing wall (8a), defining the head pipe opening (8b) of the head pipe (8), with the multiple fastening members fastened into the cowl stay and the standing wall from the outer side in the vehicle widthwise direction. This makes it possible to increase strength in supporting the cowl stay and downsize the cowl stay.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
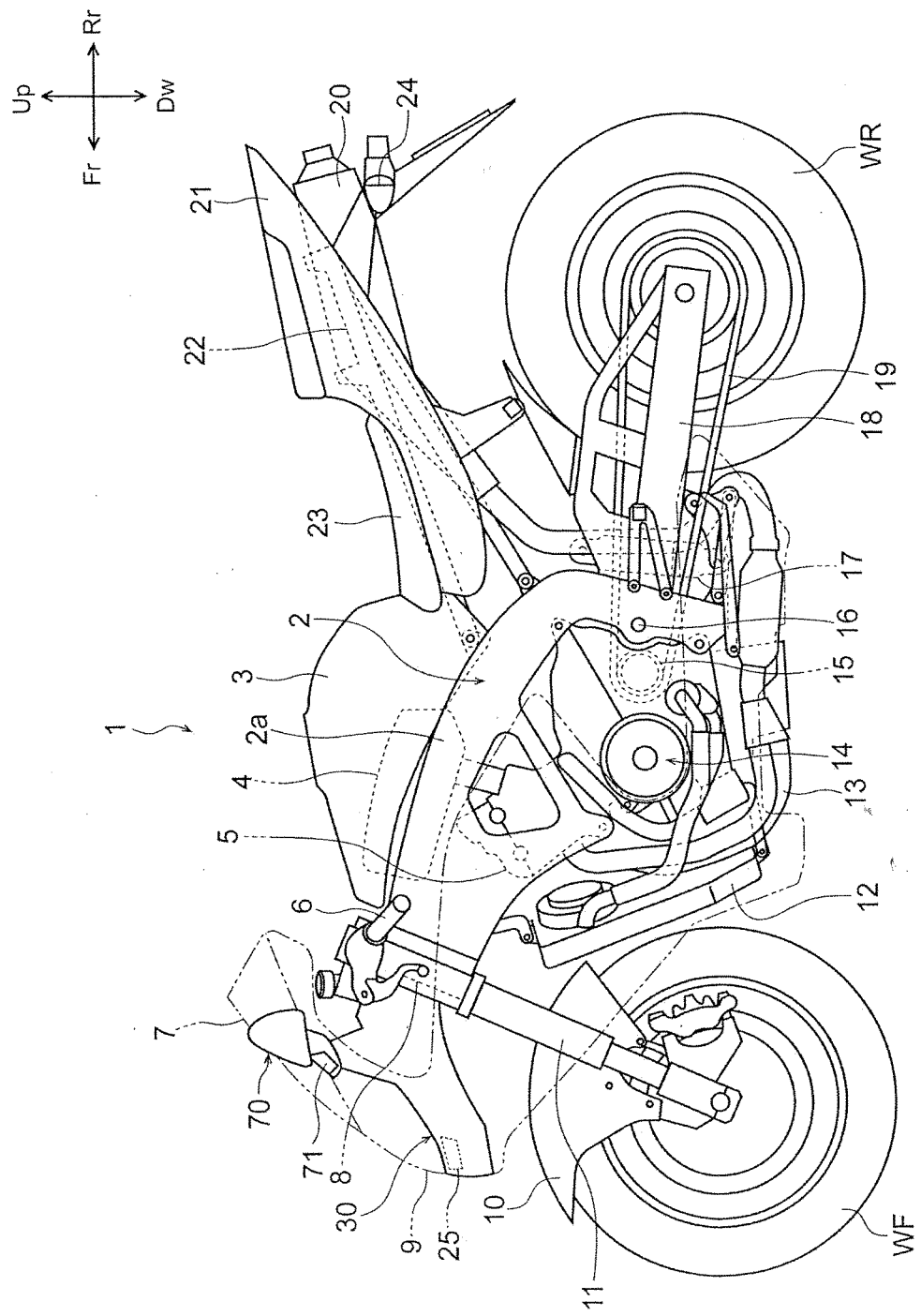
FIG. 1 is a left side view of a motorcycle (vehicle) employing a cowl stay structure for a vehicle according to an embodiment of the present invention.

FIG. 1 is a left side view of a motorcycle (vehicle) 1 employing a cowl stay structure for a vehicle according to an embodiment of the present invention.

A body frame 2 of the motorcycle 1 has two main frames 2a which support an engine 14 by pinching it from the left and right in the vehicle widthwise direction. The front ends of the main frames 2a are fixed on a head pipe 8 which axially and steerably supports a pair of front forks 11. A front wheel WF is axially and rotatably supported by the lower ends of the paired left and right front forks 11, and a steering handlebar 6 is fixed on the upper ends of the front forks 11. A front fender 10 which covers an upper part of the front wheel WF is mounted on the pair of front forks 11.

The engine 14 which is a 4-cycle multi-cylinder internal combustion engine is suspended from a lower part of the body frame 2. An intake pipe and an air cleaner box 4 are coupled to a rear part of the cylinder head 5, and an exhaust pipe 13 extending continuously from a muffler 20 is coupled to a front part of the cylinder head 5. A radiator 12 configured to release heat in cooling water of the engine 14 is disposed ahead of the exhaust pipe 13.

A swing arm 18 axially and rotatably supporting a rear wheel WR is axially and swingably supported on a pivot 16 provided in a rear lower part of the body frame 2. Drive force from the engine 14 is transmitted from a drive sprocket 15 fixed on an output shaft of the engine to the rear wheel WR through an endless drive chain 19.

A pair of left and right subframes 22 is mounted on an upper rear part of the body frame 2. A seat 23 and a seat cowl 21 are fixed on upper parts of the subframes 22. A pair of left and right rear direction indicators 24 is disposed below the muffler 20. A fuel tank 3 having a shape covering the air cleaner box 4 is disposed in front of the seat 23.

A cowling 9 as a windscreen device covers an area ranging from the front side of the steering handlebar 6 to the lower lateral sides of the engine 14. A colorless and clear or colored and clear windscreen 7 is mounted on an upper part of the cowling 9. The cowling 9 covering the front part of the vehicle body is fixed on the body frame 2 mainly with a cowl stay structure S including a cowl stay 30. The cowl stay 30 is fixed on a front part of the head pipe 8 and also supports a pair of left and right rearview mirrors 70. The rearview mirrors 70 have support portions configured to serve also as front direction indicators 71 designed to emit forward blinking light for announcing a change of direction of the motorcycle 1.

Figure 2:
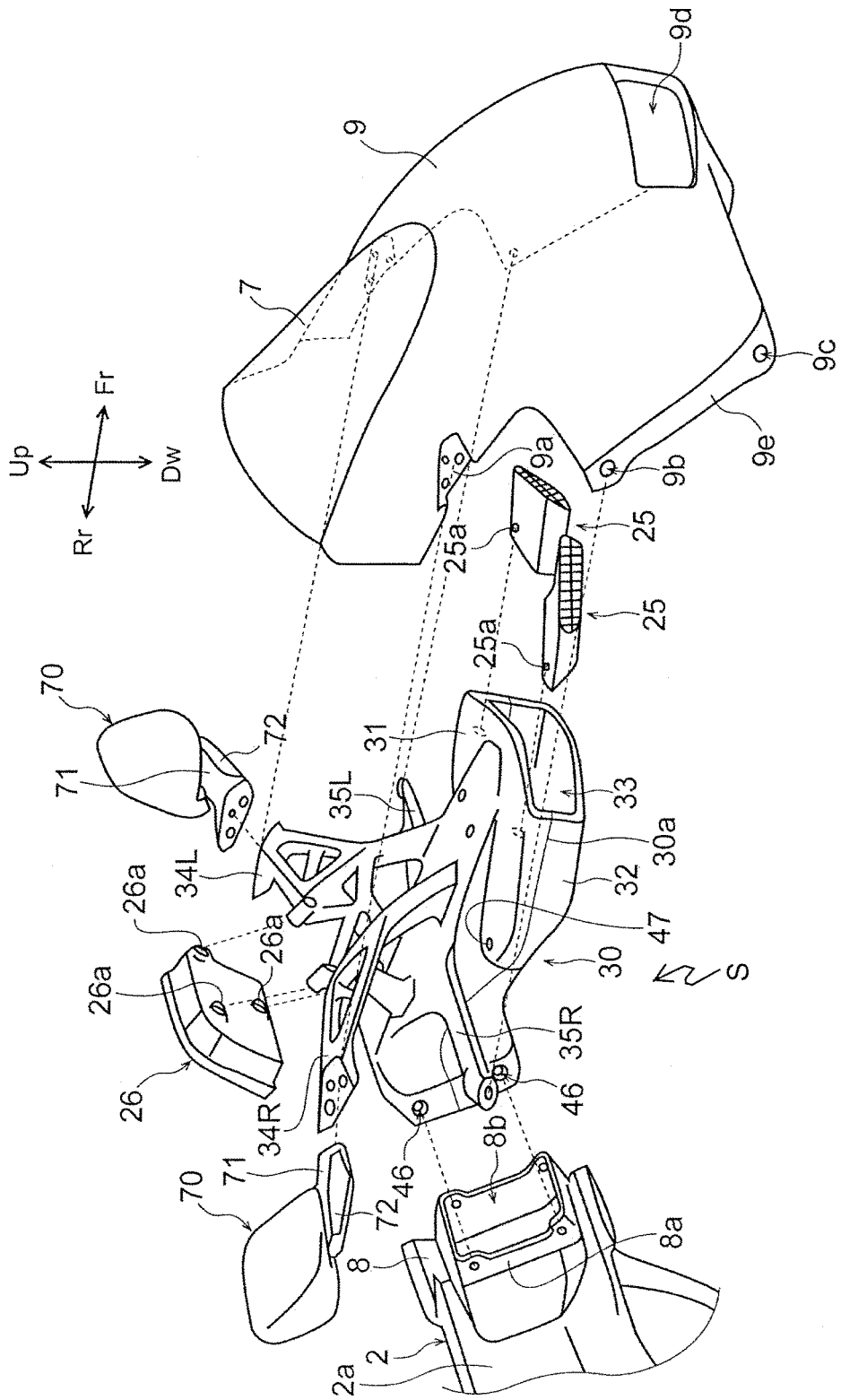
FIG. 2 is a perspective view illustrating an exploded state of a vehicle body front part structure.
Figure 3:
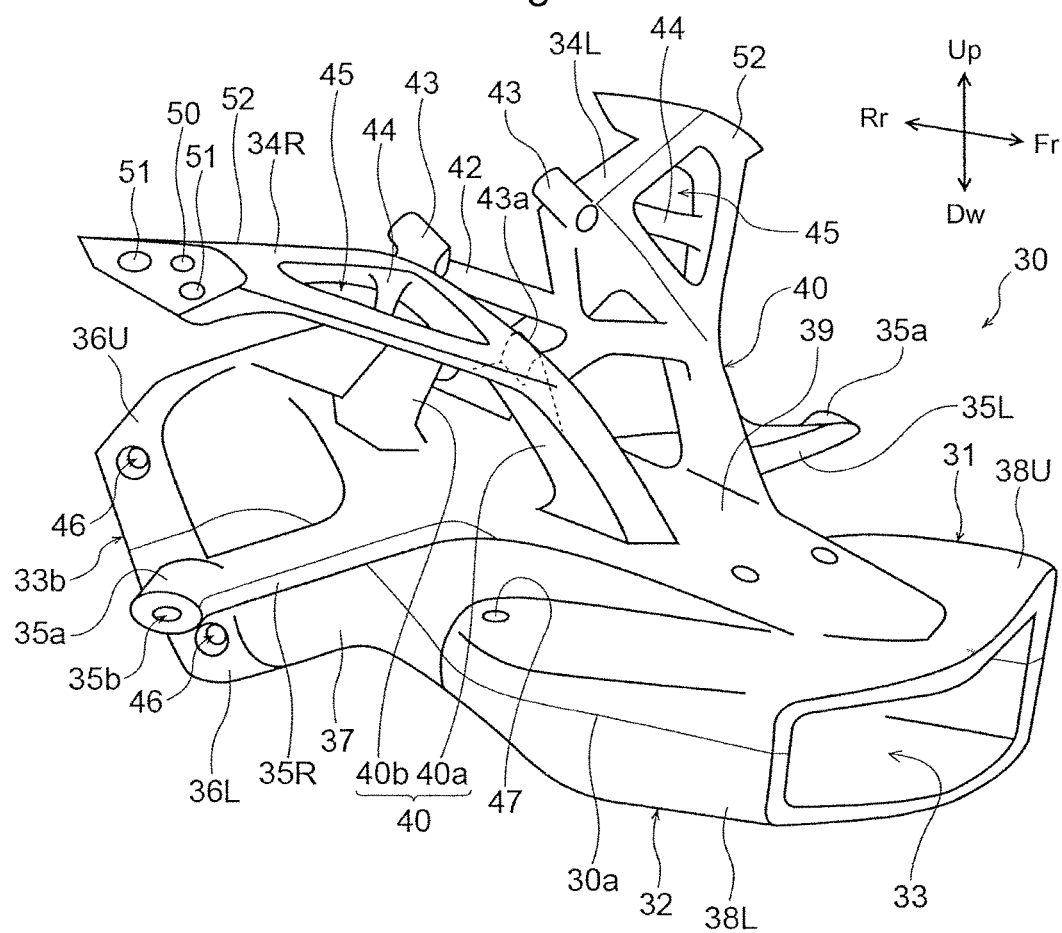
FIG. 3 is a perspective view of a cowl stay.
Figure 4:
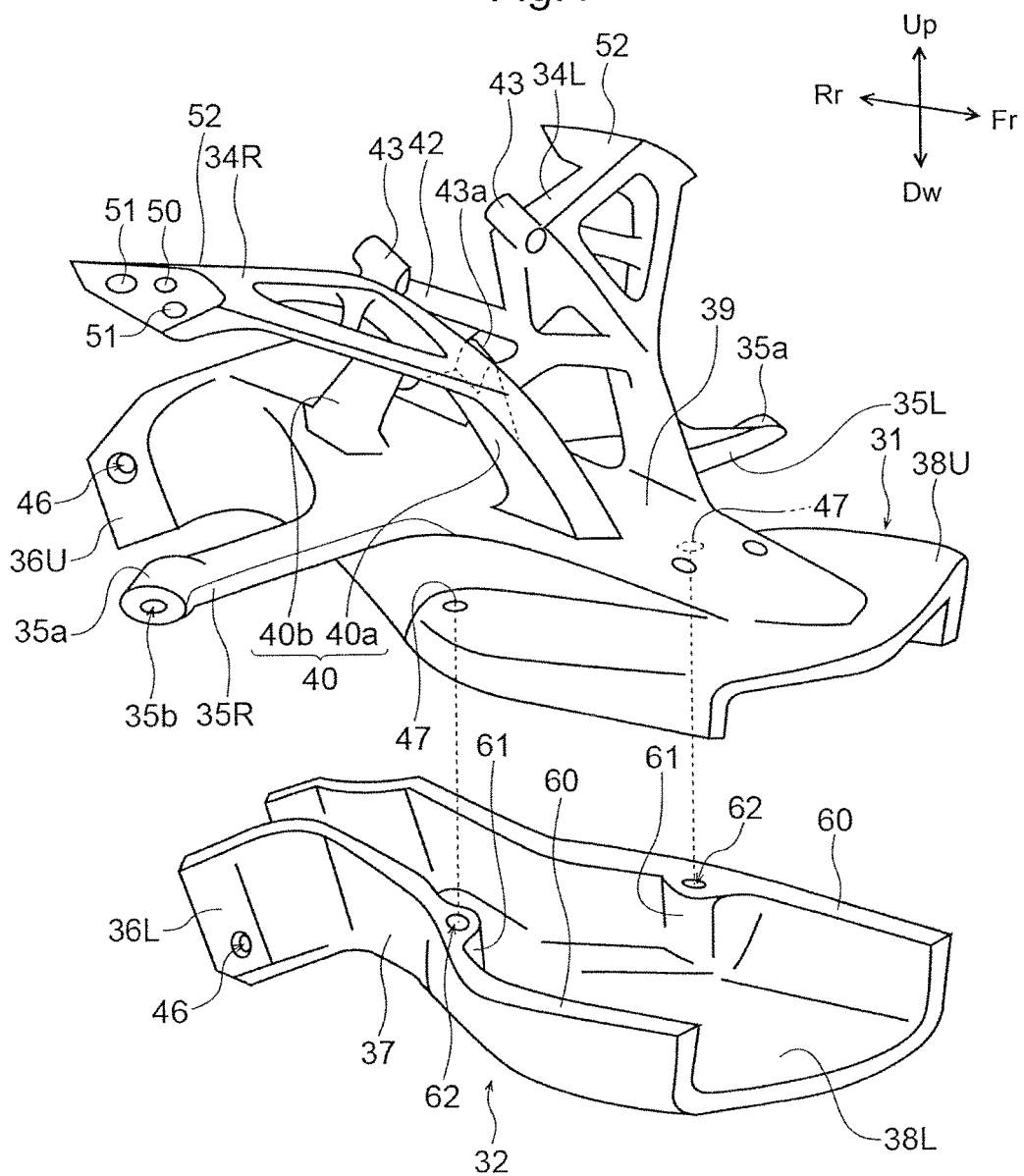
FIG. 4 is a perspective view illustrating a state where the cowl stay is exploded into an upper member and a lower member.

FIG. 2 is a perspective view illustrating an exploded state of a vehicle body front part structure. In addition, FIG. 3 is a perspective view of the cowl stay 30, and FIG. 4 is a perspective view illustrating a state where the cowl stay 30 is exploded into an upper member 31 and a lower member 32.

The cowl stay 30 is fixed on the head pipe 8 of the body frame 2. The head pipe 8 has, on both sides of a steering stem (not illustrated) designed to axially and steerably support the pair of front forks 11, slits for guiding the air introduced through a front opening 33 of the cowl stay 30 located on the front side of the vehicle body directly to the air cleaner box 4 located behind the head pipe 8. The head pipe 8 is provided with a standing wall 8a, which defines a substantially square head pipe opening 8b while surrounding two through holes, in an area ranging from the front surface of the head pipe to the main frames 2a. The cowl stay 30 is fixed on the body frame 2 by putting a box-shaped rear opening 33b formed in the rear end of the cowl stay over the standing wall 8a and fixing them together with a fastening member.

The cowl stay 30 with a hollow structure serves as a duct for guiding the air taken in from the front side of the vehicle body to the air cleaner box 4, and the horizontally-long front opening 33 is formed in a front end part of the cowl stay with respect to the vehicle body. In the cowl stay 30, the upper member 31 and the lower member 32 are made of members different in strength, and the upper member 31 is made of a member having higher strength than that of the lower member 32. In the illustrative embodiment, the cowl stay 30 is formed by fixing the upper member 31 made of metal such as aluminum and the lower member 32 made of resin such as ABS together with fastening members such as bolts. A pair of left and right headlight units (headlight) 25 having light-emitting diodes (LEDs) as its light source is placed in the front opening 33. The headlight units 25 are fixed on the lower surface of the upper member 31, which constitutes the front opening 33, with fastening members passing through fastening holes 25a.

The upper member 31 has: first laterally extending portions 34L and 34R which extend outward in the vehicle widthwise direction for supporting the rearview mirrors 70 and the cowling 9; and second laterally extending portions 35L and 35R which extend outward in the vehicle widthwise direction for supporting the cowling 9. The rearview mirrors 70 are respectively fixed on end parts of the first laterally extending portions 34L and 34R with mounting portions 9a of the cowling 9 interposed therebetween. A box-shaped meter device 26 is fixed on rear parts of the first laterally extending portions 34L and 34R. The meter device 26 has three mounting portions 26a.

The cowling (upper cowl) 9 constituting an upper portion of an exterior part is joined to a lower portion (not illustrated) thereof at division portions 9e each having an upper mounting hole 9b and a lower mounting hole 9c. The second laterally extending portions 35L and 35R of the cowl stay 30 support the cowling 9 at the upper mounting holes 9b of the division portions 9e. The second laterally extending portions 35L and 35R are each provided at its end part with a boss 35a having a mounting hole 35b in which a fastening member such as a bolt is to be screwed. A horizontally-long introduction port 9d formed in a front lower part of the cowling 9 engages with the front opening 33 of the cowl stay 30.

Referring to FIGS. 3 and 4, the upper member 31 and the lower member 32 are joined together at a division line 30a to constitute an air intake duct with a hollow structure having a horizontally-long inlet and a substantially rectangular outlet. The upper member 31 and the lower member 32 are joined together with fastening members (not illustrated) such as bolts which engage with a pair of left and right insertion holes 47 formed in the upper member 31.

A rear opening of the cowl stay 30 is formed from an upper engaging portion 36U formed in the upper member 31 and a lower engaging portion 36L formed in the lower member 32, and they are fixed on the body frame 2 with fastening members (not illustrated) such as bolts passing through fixation holes 46 and being directed in the vehicle widthwise direction.

A pair of left and right upward extending portions 40 is provided on a top portion 39 of the upper member 31. The upward extending portions 40 each have a front upward extending portion 40a and a rear upward extending portion 40b forming a triangular arch. A coupling portion 42 which is shaped substantially in the form of an X as the cowl stay 30 is seen in a plan view and couples the left and right upward extending portions 40 is provided on upper end parts of the respective upward extending portions 40.

The first laterally extending portions 34L and 34R extending outward in the vehicle widthwise direction are coupled together at the upper end parts of the upward extending portions 40 at positions opposite positions where the coupling portion 42 is coupled. A pair of left and right mounting bosses 43 for supporting the meter device 26 is provided on the rear ends of proximal parts of the first laterally extending portions 34L and 34R, and the third mounting boss 43a is provided between the left and right rear upward extending portions 40b.

The first laterally extending portions 34L and 34R each have a truss structure having a thinning hole 45 with a bar-shaped oblique member 44, which largely reduces its weight while keeping its strength. In the upper member 31, its parts including the top portion 39, the first laterally extending portions 34L and 34R, and the second laterally extending portions 35L and 35R are formed as an integrated unit by aluminum casting.

Direction indicator support portions 52 are respectively formed at outer end parts of the first laterally extending portions 34L and 34R in the vehicle widthwise direction. In each direction indicator support portion 52, two fastening holes 51 for fixing the corresponding rearview mirror 70, and an eyelet 50 for a direction indicator harness configured to supply power to the direction indicator 71 serving also as the rearview mirror 70 support portion are formed.

Referring to FIG. 4, an upper duct half 38U constituting a front end part of the top portion 39 of the upper member 31 and a lower duct half 38L constituting a front end part of the lower member 32 are each shaped in the form of a thin plate for weight reduction. The entire lower member 32 is made of synthetic resin, which enables the cowl stay 30 to largely reduce its weight while keeping the strength of the first laterally extending portions 34L and 34R and the second laterally extending portions 35L and 35R supporting the rearview mirrors 70 and the cowling 9. To form the lower member 32 with synthetic resin leads to weight reduction of a portion of the cowl stay 30 far from the head pipe 8 supporting the cowl stay, which reduces a bending moment to act on the joint portion between the cowl stay and the head pipe and thus reduces a load to be applied on the standing wall 8a.

The lower member 32 comes in contact with the upper member 31 at a flat joint surface 60, and is fastened to the upper member 31 with fastening members (not illustrated) by means of mounting holes 62 of bosses 61 formed inside the lower member. The cowl stay 30 has a tubular shape by joining the upper member 31 and the lower member 32 together, and it becomes the shape of a closed-end box by mounting the cowl stay to the head pipe 8, thus achieving high structural strength. This enables the thinning of the upper member 31 and the lower member 32.

At an area reducing portion 37 located at substantially the center of the cowl stay 30 in the longitudinal direction, the shape of the inner space of the cowl stay is deformed into a substantially rectangular shape the area of which is smaller than that of the inlet. Such shape reduces the opening size of the head pipe opening 8b of the head pipe 8 as compared with that of the inlet, which makes it possible to increase the flow velocity of traveling wind used as intake air and take in the air efficiently.

Figure 5:
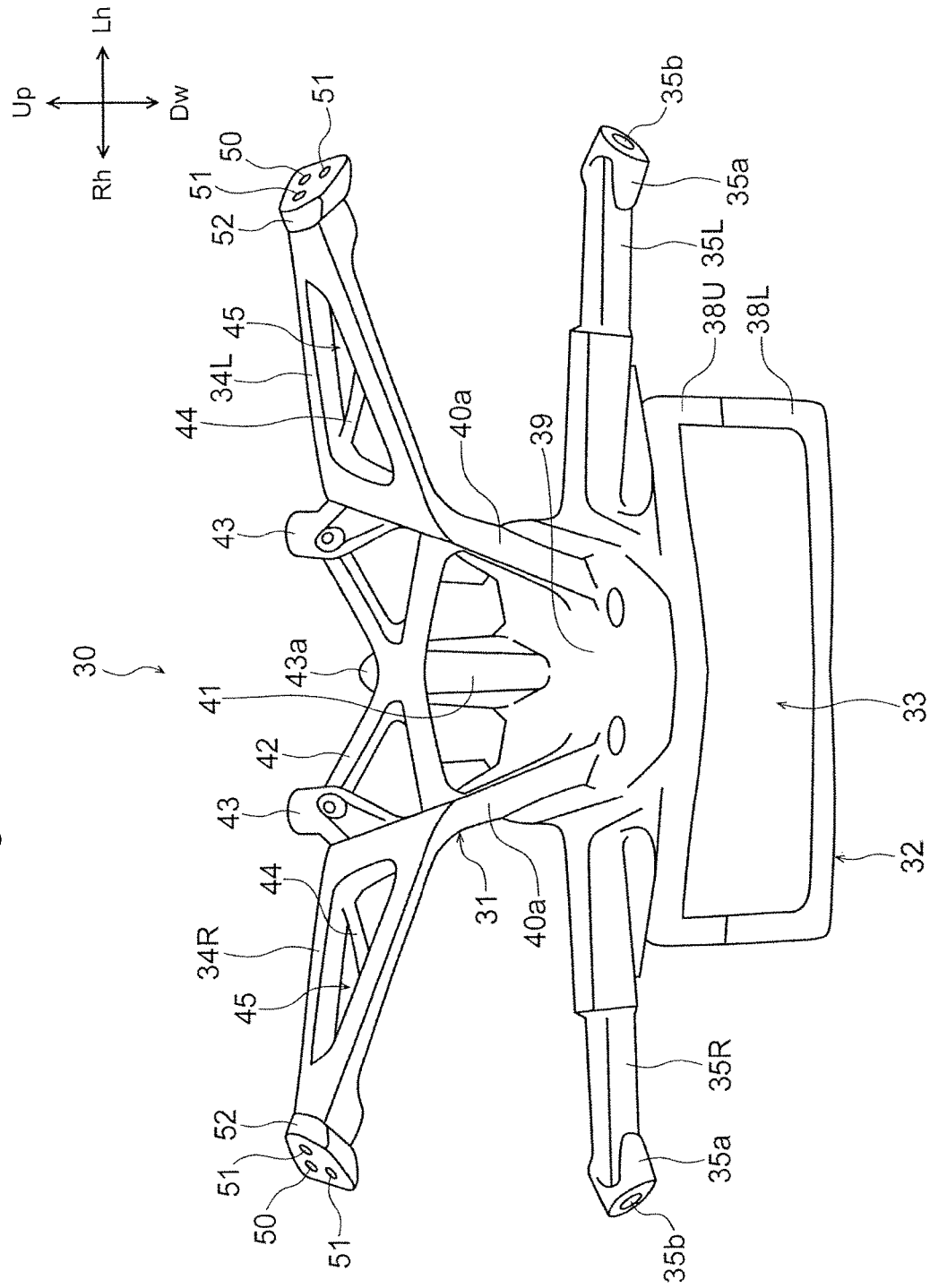
FIG. 5 is a front view of the cowl stay.
Figure 6:
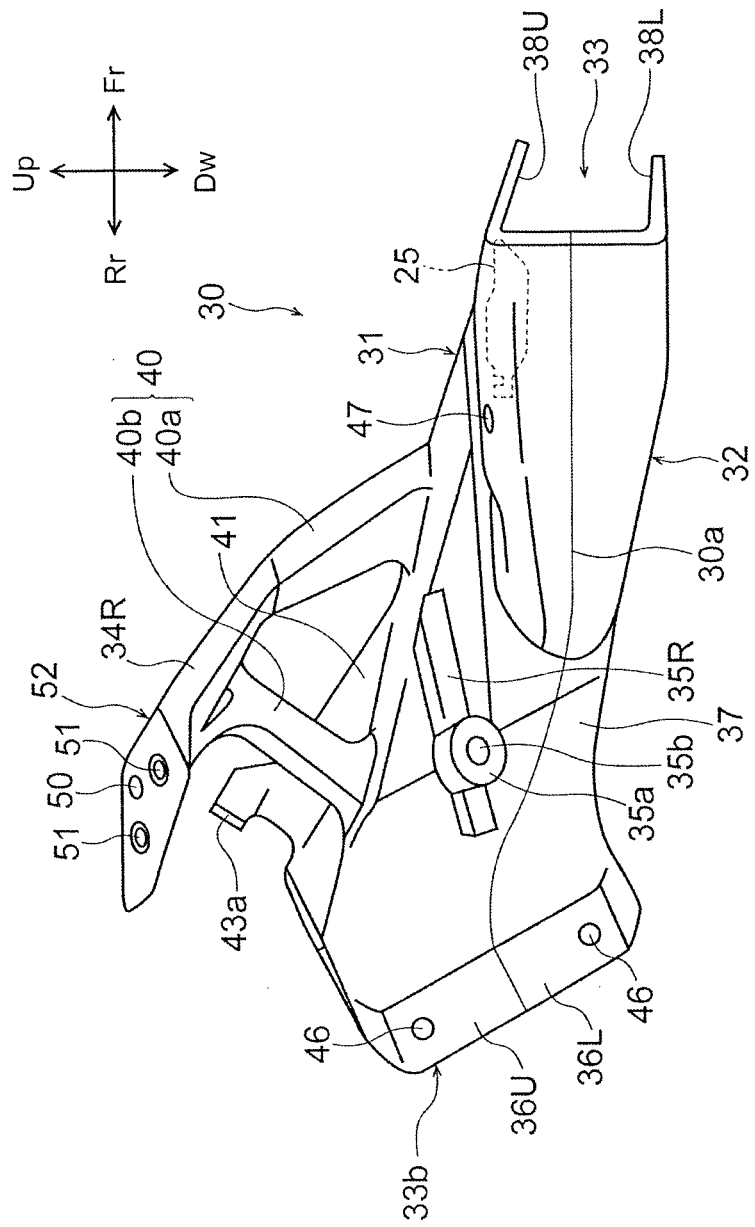
FIG. 6 is a right side view of the cowl stay.

FIG. 5 is a front view of the cowl stay 30. In addition, FIG. 6 is a right side view of the cowl stay 30. The upward extending portions 40 each formed from the front upward extending portion 40a and the rear upward extending portion 40b stand on the top portion 39 while tilting outward in the vehicle widthwise direction as the cowl stay 30 is seen in a front view. The X-shaped coupling portion 42 increases strength by coupling the upper ends of the upward extending portions 40 together, and also serves as a stylish design. A lower support portion 41 standing on the top portion 39 to support the mounting boss 43a of the meter device 26 from below is provided below the coupling portion 42.

The second laterally extending portions 35L and 35R coupled to the upper mounting holes 9b of the cowling 9 each have the shape of a stepped round bar. On the other hand, the first laterally extending portions 34L and 34R each have a configuration where a triangular flat plate is thinned, and have a truss structure extending continuously from the coupling portion 42 to increase its strength. Thereby, the cowl stay 30 can be downsized, and the truss structure provides a stylish design. In addition, the second laterally extending portions 35L and 35R extend substantially in the vehicle widthwise direction, whereas the first laterally extending portions 34L and 34R tilt upward toward their outer ends so that they are not visible in front of the meter device 26.

The front opening 33 which is horizontally long in the front view is formed in the front end of the cowl stay 30 by combining the thin plate-shaped upper duct half 38U and lower duct half 38L. The rear opening 33b of the cowl stay 30 is formed in a substantially rectangular shape by the upper engaging portion 36U formed in the upper member 31 and the lower engaging portion 36L formed in the lower member 32.

Figure 7:
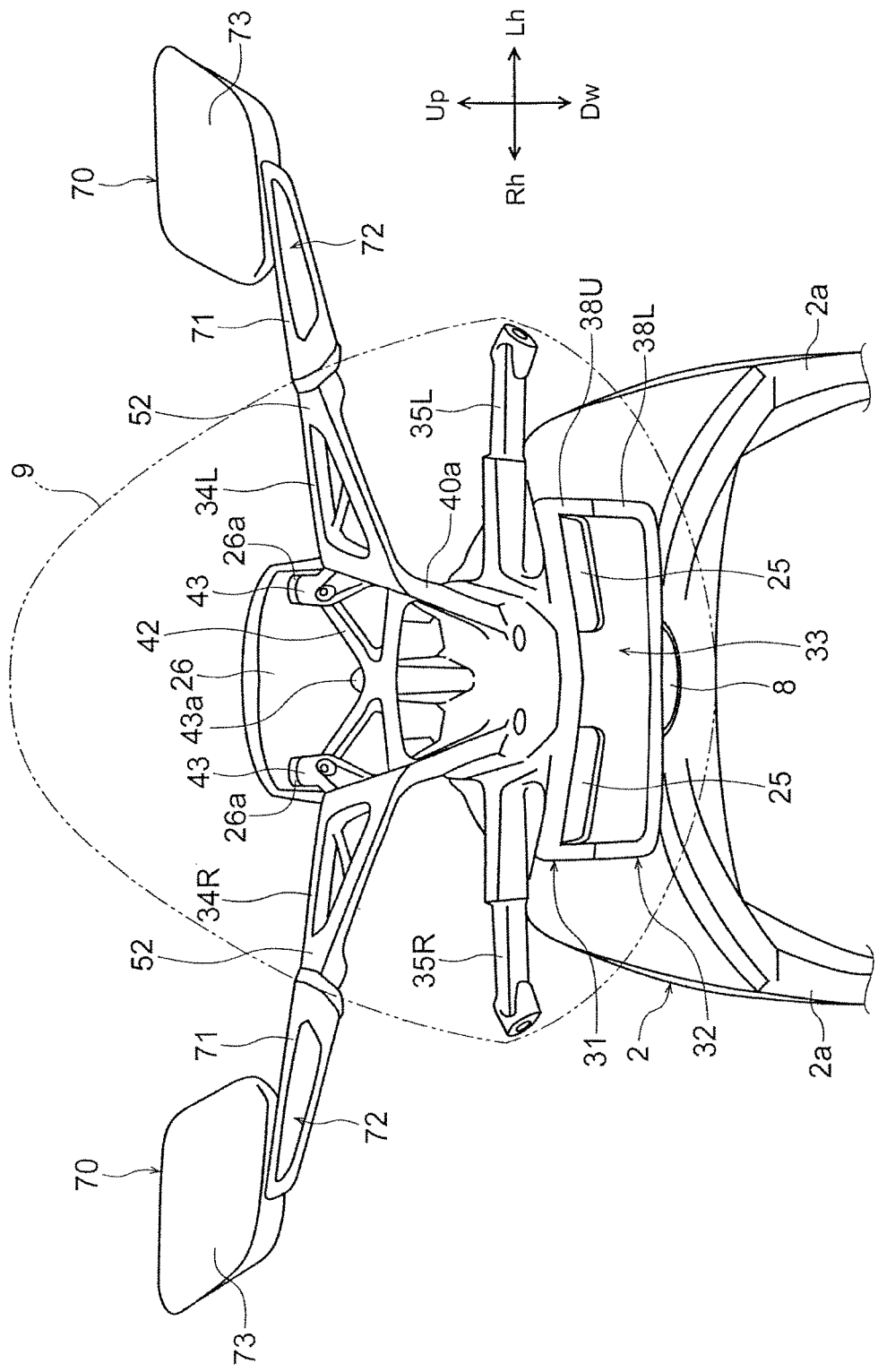
FIG. 7 is a front view illustrating the vehicle body front part structure.

FIG. 7 is a front view illustrating the vehicle body front part structure. The paired left and right headlight units 25 are spaced from each other so as to extend along both ends of the upper duct half 38U defining the front opening 33. The front opening 33 has a horizontally-long shape extending to the main frames 2a through the head pipe 8, and the headlight units 25 are actively cooled by the air introduced through the front opening 33.

The rearview mirrors 70 each have: a mirror housing 73 which supports a platy mirror body; and the bar-shaped direction indicator 71 supporting the mirror housing 73. The mirror housing 73 and the direction indicator 71 can be made of synthetic resin, for example. A horizontally long-shaped direction indicator lens surface 72 is welded to the direction indicator 71. The first laterally extending portions 34L and 34R and the direction indicators 71 are configured to form a straight line as a whole once the rearview mirrors 70 are mounted on the first laterally extending portions 34L and 34R. The meter device 26 is configured to be housed within the width between the left and right upward extending portions 40 once fixed by means of the three mounting bosses 43, 43, and 43a.

Figure 8:
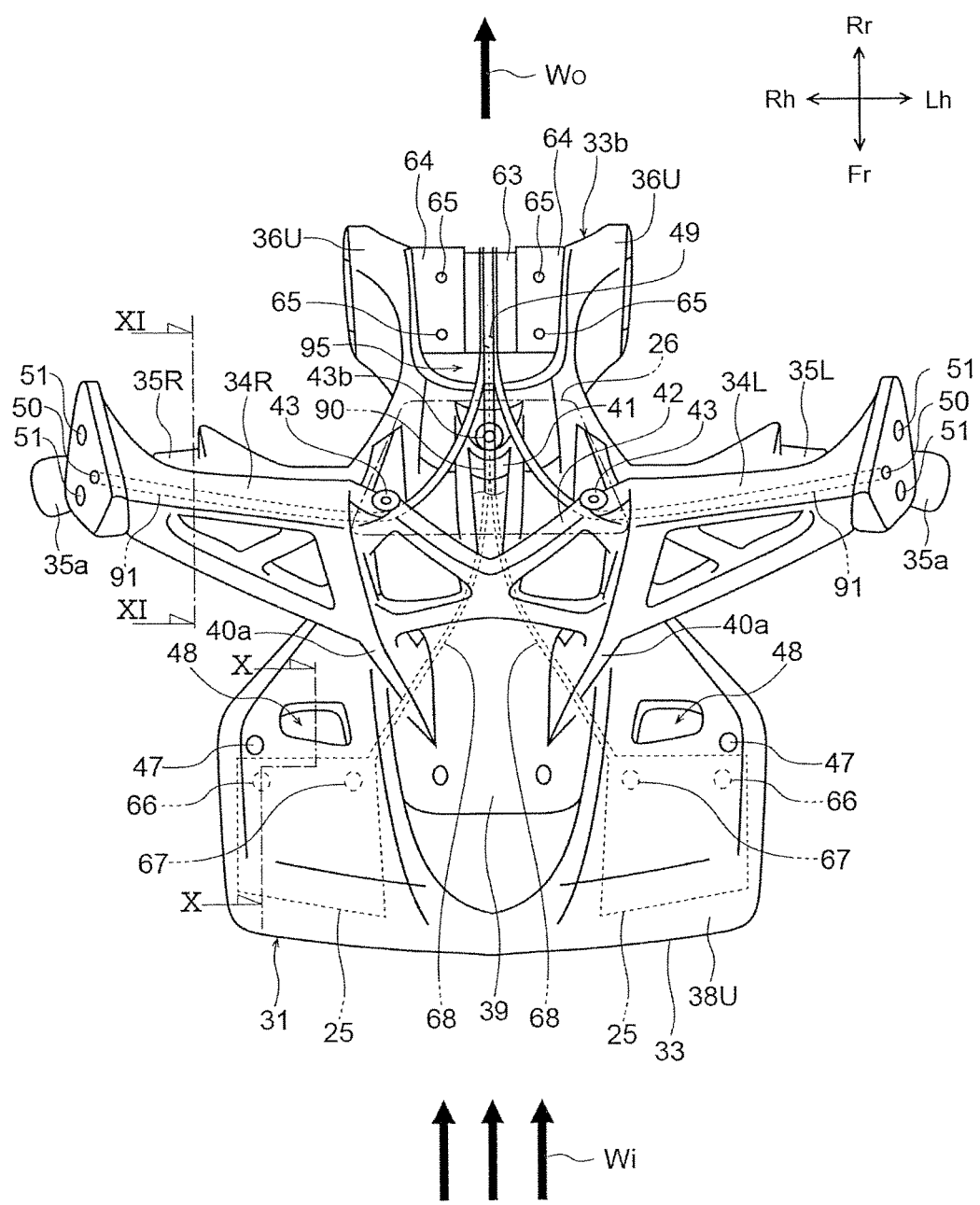
FIG. 8 is a plan view of the cowl stay.
Figure 9:
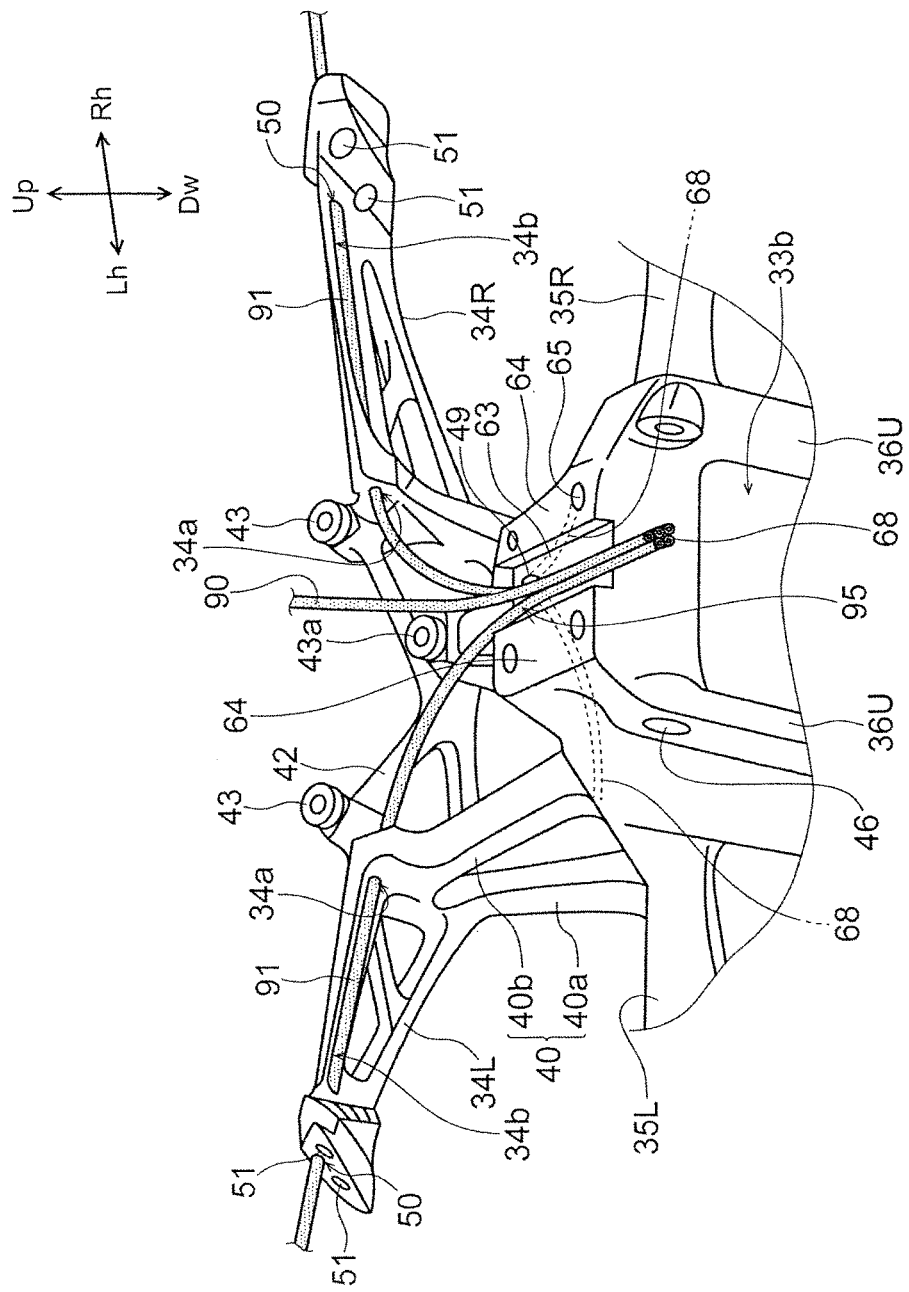
FIG. 9 is a perspective view illustrating the state of the cowl stay as seen from the rear side of a vehicle body.

FIG. 8 is a plan view of the cowl stay 30. In addition, FIG. 9 is a perspective view illustrating the state of the cowl stay 30 as seen from the rear side of the vehicle body. The headlight units 25 are fixed on the lower surface of the upper member 31 with fastening members 66 and 67. Heat sink openings 48 through which to expose heat sinks 25g (see FIG. 10) arranged on rear parts of the headlight units 25 are provided in the upper member 31 on the side thereof behind the headlight units 25. It may be noted that, in the case where the headlight units 25 have no heat sinks 25g, the heat sink openings 48 do not necessarily have to be provided. As described previously, an intake air Wi introduced through the horizontally-long front opening 33 is discharged as an exhaust air Wo through the rear opening 33b the area of which is smaller than that of the front opening 33.

A flat bottom surface 63 and elevated surfaces 64 arranged on both sides of the bottom surface with a step in between are formed behind the lower support portion 41 on which the mounting boss 43a located at the center in the vehicle widthwise direction is formed. A through hole 49 through which a headlight harness 68 configured to supply power to the headlight units 25 passes is formed on the front side of the bottom surface 63 with respect to the vehicle body. Tapped holes 65 for fixing a platy member (not illustrated) covering the bottom surface 63 and the elevated surfaces 64 are provided in the elevated surfaces 64. It may be noted that, a navigation device and the like may be used instead as the platy member fixed on the elevated surfaces 64.

As illustrated in FIG. 9, the bottom surface 63 and the elevated surfaces 64 are formed at an upper position of the substantially square rear opening 33*b* so as to tilt toward the rear of the vehicle body. On the bottom surface 63, a gathering area 95 where the headlight harness 68 drawn upward through the through hole 49, a meter device harness 90 configured to provide power and sensor information to the meter device 26, and a direction indicator harness 91 configured to supply power to the left and right direction indicators 71 are gathered together is formed. With such layout, the harnesses can be led toward the rear of the vehicle body while bending of them is minimized and, by fixing a platy member (not illustrated) on the elevated surfaces 64, the harnesses can be positioned in place and protected. Here, optical fibers may be used as the harnesses.

Figure 11:
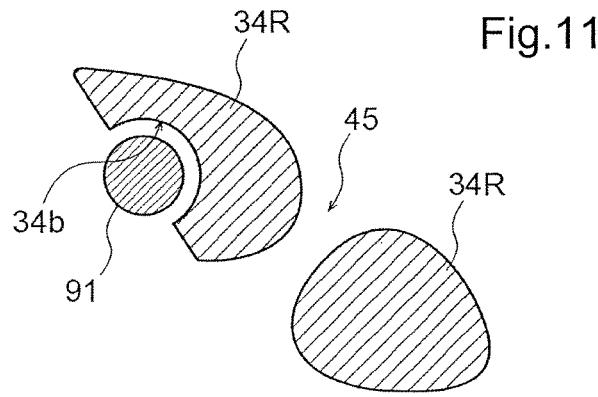
FIG. 11 is a sectional view taken along a line XI-XI in FIG. 8.

The direction indicator harness 91 passes through eyelets 34*a* respectively provided in joint portions between the rear upward extending portions 40*b* and the first laterally extending portions 34L and 34R, is then led to the outer side in the vehicle widthwise direction along guide grooves 34*b* each formed to have a C shape in cross section, and then reaches the direction indicators 71 through the eyelets 50 located on the outer side in the vehicle widthwise direction. Each guide groove 34*b* is formed to have a C shape in cross section as illustrated in FIG. 11 which is a sectional view taken along a line XI-XI in FIG. 8 and designed to position the direction indicator harness 91 in place. With such configuration, the direction indicator harness 91 can be routed to predetermined positions without separate stays and the like, whereby the structure of the cowl stay 30 is simplified.

Figure 10:
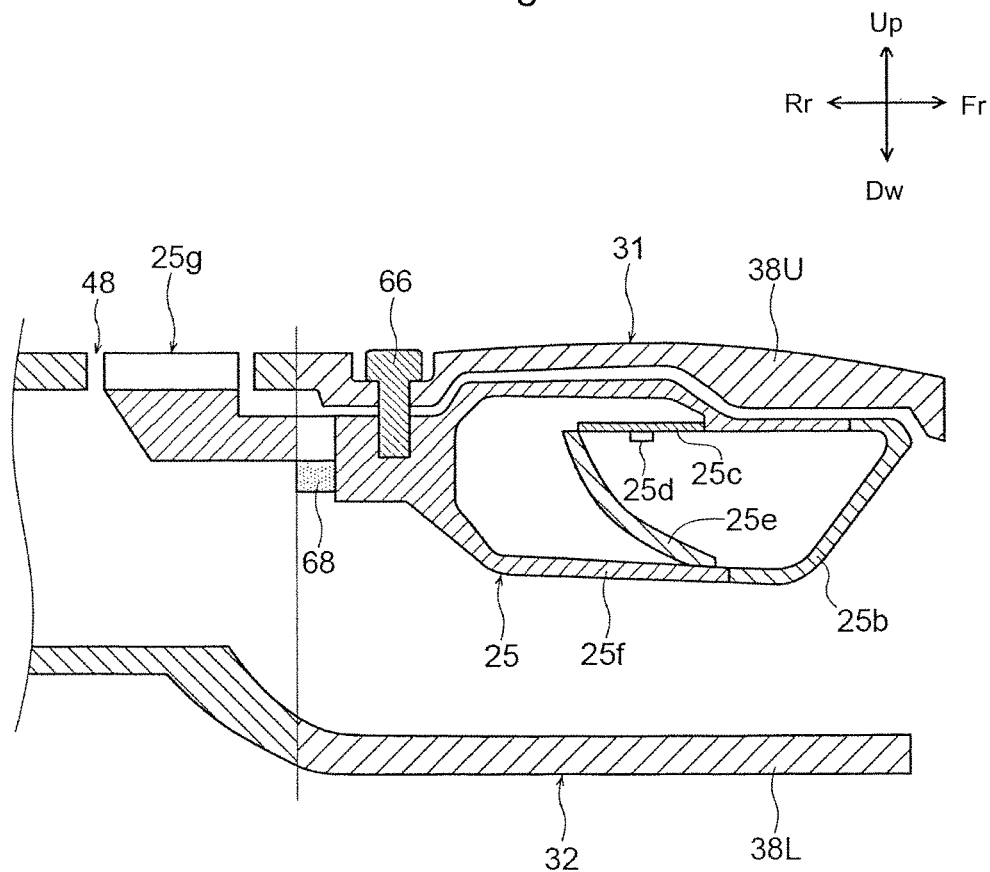
FIG. 10 is a sectional view taken along a line X-X in FIG. 8.

FIG. 10 is a sectional view taken along a line X-X in FIG. 8. The headlight unit 25 illustrated in this drawing is of a type with no heat sink. The headlight unit 25 has a configuration where a board 25*c* having LED elements 25*d* installed and a reflector 25*e* designed to reflect light emitted from a light source toward the front of the vehicle body are housed inside a housing 25*f* made of synthetic resin with a color of black or the like, and the housing is covered with a lens member 25*b* made of colorless and clear synthetic resin or the like. With the structure where light emitted from the LED elements 25*d* is directed toward the bottom of the vehicle body and its irradiation range is regulated by the reflector 25*e*, the vertical size of the housing 25*f* can be reduced.

An upper surface of the housing 25*f* of the headlight unit 25 has a shape matching the upper duct half 38U, so that they are arranged close to each other by fastening the fastening member 66. A cushion member for absorbing vibrations and a thermal conductive member which easily transfers heat generated from the LED elements 25*d* may be interposed between the headlight unit 25 and the upper duct half 38U.

It may be noted that, the form of the motorcycle, the shape and material of the cowling, the shape and structure of the cowl stay, the divided structure of the cowl stay, the materials of the upper member and the lower member, and the like are not limited to those of the above embodiment and can be changed in various ways. For example, the tubular portion of the cowl stay may be formed as one unit. The cowl stay structure according to the present invention is applicable not only to motorcycles but also to various vehicles having a head pipe and a cowling.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE NUMERALS

1 MOTORCYCLE (VEHICLE)
2 BODY FRAME
2*a* MAIN FRAME
4 AIR CLEANER BOX
8 HEAD PIPE
8*a* STANDING WALL
8*b* HEAD PIPE OPENING
9 COWLING
25 HEADLIGHT UNIT
26 METER DEVICE
30 COWL STAY
31 UPPER MEMBER
32 LOWER MEMBER
33 FRONT OPENING
33*b* REAR OPENING
34*b* GUIDE GROOVE
34L, 34R FIRST LATERALLY EXTENDING PORTION
35L, 35R SECOND LATERALLY EXTENDING PORTION
40 UPWARD EXTENDING PORTION
42 COUPLING PORTION
43, 43*a* MOUNTING BOSS
44 THINNING PORTION
49 THROUGH HOLE
52 DIRECTION INDICATOR SUPPORTING PORTION
68 HEADLIGHT HARNESS
70 REARVIEW MIRROR
71 DIRECTION INDICATOR
72 DIRECTION INDICATOR LENS SURFACE
90 METER DEVICE HARNESS
91 DIRECTION INDICATOR HARNESS
95 JUNCTION AREA

What is claimed is:

1. A cowl stay structure for a vehicle, said vehicle comprising a body frame, a head pipe mounted on a front end of the body frame and having a head pipe opening formed therein, an air cleaner box, a cowling, and a headlight; said cowl stay structure configured to be mounted on a front end part of the body frame and to support the cowling;

said cowl stay structure comprising a cowl stay which supports said cowling, said cowl stay having a front opening formed therein, the front opening being a hollow structure serving as a duct for guiding air taken in from a front side of the vehicle to the air cleaner box; wherein said cowl stay is mounted on a front surface of the head pipe so as to continue a flow path of the front opening with said head pipe opening, said head pipe opening serving as an air intake for said air cleaner box; and said headlight is placed inside said cowl stay, and configured to irradiate an area in front of the vehicle;

wherein said cowl stay comprises an upper member and a lower member, said upper and lower members being arranged vertically so as to form the hollow structure; said upper member supports at least said cowling and said headlight; and said upper member and said lower member are made of materials which are different in strengths such that said upper member is made of the material having higher strength than that of said lower member.

2. The cowl stay structure for a vehicle according to claim 1, wherein: said vehicle further comprises a meter device configured to display vehicle information; said cowl stay comprises a pair of left and right upward extending portions extending upward on an upper surface of said cowl stay; upper end parts of respective said upward extending portions are coupled together by a coupling portion having a truss structure, said truss structure having a mounting boss provided thereon; and said mounting boss supports the meter device.

3. The cowl stay structure for a vehicle according to claim 2, wherein said cowl stay further comprises a pair of first laterally extending portions which are coupled to upper end parts of said upward extending portions and extend outward in a vehicle widthwise direction; said first laterally extending portions each has a direction indicating supporting portion; and said first laterally extending portions each support at least one of a rearview mirror and a direction indicator at the direction indicator supporting portion.

4. The cowl stay structure for a vehicle according to claim 3, wherein said first laterally extending portions each include a truss-shaped thinning portion.

5. The cowl stay structure for a vehicle according to claim 4, wherein said cowl stay has a rear opening formed therein; said head pipe has a box-shaped standing wall defining said head pipe opening; the cowl stay at the rear opening side thereof is fixed on the box-shaped standing wall with a plurality of fastening members fastened into said cowl stay and said standing wall from an outer side in the vehicle widthwise direction.

6. The cowl stay structure for a vehicle according to claim 3, wherein: said cowl stay has a though hole formed therein at a position behind said meter device; a headlight harness configured to supply power to said headlight passes through the through hole; and in an area behind said meter device, said headlight harness constitutes a junction area where said headlight harness meets with a meter device harness coupled to said meter device.

7. The cowl stay structure for a vehicle according to claim 3, wherein said cowl stay has a rear opening formed therein; said head pipe has a box-shaped standing wall defining said head pipe opening; the cowl stay at the rear opening side thereof is fixed on the box-shaped standing wall with a plurality of fastening members fastened into said cowl stay and said standing wall from an outer side in the vehicle widthwise direction.

8. The cowl stay structure for a vehicle according to claim 2, wherein: said cowl stay has a though hole formed therein at a position behind said meter device; a headlight harness configured to supply power to said headlight passes through the through hole; and in an area behind said meter device, said headlight harness constitutes a junction area where said headlight harness meets with a meter device harness coupled to said meter device.

9. The cowl stay structure for a vehicle according to claim 8, wherein said first laterally extending portions each have a guide groove formed therein, said guide groove having a C shape in cross section; a direction indicator harness configured to supply power to each direction indicator is routed along said guide grooves; and said direction indicator harness meets with said headlight harness and said meter device harness at said junction area.

10. The cowl stay structure for a vehicle according to claim 9, wherein said cowl stay has a rear opening formed therein; said head pipe has a box-shaped standing wall defining said head pipe opening; the cowl stay at the rear opening side thereof is fixed on the box-shaped standing wall with a plurality of fastening members fastened into said cowl stay and said standing wall from an outer side in the vehicle widthwise direction.

11. The cowl stay structure for a vehicle according to claim 8, wherein said cowl stay has a rear opening formed therein; said head pipe has a box-shaped standing wall defining said head pipe opening; the cowl stay at the rear opening side thereof is fixed on the box-shaped standing wall with a plurality of fastening members fastened into said cowl stay and said standing wall from an outer side in the vehicle widthwise direction.

12. The cowl stay structure for a vehicle according to claim 2, wherein: said cowl stay has a though hole formed therein at a position behind said meter device; a headlight harness configured to supply power to said headlight passes through the through hole; and in an area behind said meter device, said headlight harness constitutes a junction area where said headlight harness meets with a meter device harness coupled to said meter device.

13. The cowl stay structure for a vehicle according to claim 2, wherein said cowl stay has a rear opening formed therein; said head pipe has a box-shaped standing wall defining said head pipe opening; the cowl stay at the rear opening side thereof is fixed on the box-shaped standing wall with a plurality of fastening members fastened into said cowl stay and said standing wall from an outer side in the vehicle widthwise direction.

14. The cowl stay structure for a vehicle according to claim 1, wherein said cowl stay has a rear opening formed therein; said head pipe has a box-shaped standing wall defining said head pipe opening; the cowl stay at the rear opening side thereof is fixed on the box-shaped standing wall with a plurality of fastening members fastened into said cowl stay and said standing wall from an outer side in the vehicle widthwise direction.

15. A motorcycle comprising an air cleaner box; a body frame; a head pipe mounted on said body frame; a cowl stay mounted on a front end part of said body frame and front part of the head pipe; and a cowling supported by said cowl stay; a headlight arranged inside said cowl stay; wherein: said cowl stay has a front opening formed therein for guiding air taken in from a front side of the vehicle to the air cleaner box; said cowling has an introduction port therein which engages with the front opening; said head pipe has a head pipe opening formed therein which engages with front opening and which serves as air intake for the air cleaner box; said cowl stay comprises an upper member and a lower member, wherein said upper member is made of a material having higher strength than that of said lower member.

* * * * *